United States Patent
Shin et al.

(10) Patent No.: US 9,948,192 B2
(45) Date of Patent: Apr. 17, 2018

(54) QUASI-RESONANT OPERATION OF A POWER CONVERSION CIRCUIT INCLUDING SWITCHES SYMMETRICALLY ARRANGED ABOUT A TRANSFORMER

(71) Applicant: TOYOTA MOTOR ENGINEERING & MANUFACTURING NORTH AMERICA, INC., Erlanger, KY (US)

(72) Inventors: Jongwon Shin, Ann Arbor, MI (US); Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 14 days.

(21) Appl. No.: 15/146,379

(22) Filed: May 4, 2016

(65) Prior Publication Data
US 2017/0324341 A1 Nov. 9, 2017

(51) Int. Cl.
*H02M 3/335* (2006.01)
*H02M 1/08* (2006.01)
*H02M 1/00* (2006.01)

(52) U.S. Cl.
CPC ......... *H02M 3/33546* (2013.01); *H02M 1/08* (2013.01); *H02M 2001/0009* (2013.01)

(58) Field of Classification Search
CPC .................................................. H02M 3/335
USPC ....... 363/21.02, 21.003, 21.04, 21.06, 21.07, 363/21.08, 21.1, 21.11, 123, 125, 126, 363/127
See application file for complete search history.

(56) References Cited

U.S. PATENT DOCUMENTS 5,451,962 A * 9/1995 Steigerwald ............ G01S 7/282
323/266
6,084,790 A * 7/2000 Wong .................. H02M 3/1584
323/272

(Continued)

FOREIGN PATENT DOCUMENTS

EP 0 432 603 A2 6/1991

OTHER PUBLICATIONS

"FSQ510/FSQ510MX Green Mode Fairchild Power Switch (FPS™) for Valley Switching Converter—*Low EMI and High Efficiency*", Fairchild Semiconductor Corporation, Rev. 1.4.0, Jan. 2014, 14 pages.

(Continued)

*Primary Examiner* — Adolf Berhane
*Assistant Examiner* — Nusrat Quddus
(74) *Attorney, Agent, or Firm* — Oblon, McClelland, Maier & Neustadt, L.L.P.

(57) ABSTRACT

A power system includes DC-DC power conversion circuitry that has a first switch and a second switch on either side of a transformer. An amount of power transfer from a primary side to the secondary side of the DC-DC power conversion circuitry is controlled based on an amount of on-time or off-time of the first switch. A power threshold is determined corresponding to a lowest amount of power transfer that results in soft switching of the second switch with a constant off-time of the first switch. The DC-DC power conversion circuitry is operated in a quasi-resonant mode when the amount of power transfer from the primary side to the secondary side of the DC-DC power conversion circuitry is less than the power threshold.

19 Claims, 14 Drawing Sheets

(56) References Cited

U.S. PATENT DOCUMENTS

| | | | |
|---|---|---|---|
| 7,738,266 B2 | 6/2010 | Jacques et al. | |
| 9,024,541 B2 * | 5/2015 | Xie | H02M 3/33507 |
| | | | 315/224 |
| 9,077,254 B2 | 7/2015 | Orr et al. | |
| 9,705,414 B2 * | 7/2017 | Ausseresse | H02M 3/33576 |
| 2014/0078783 A1 | 3/2014 | Huang et al. | |
| 2014/0092646 A1 * | 4/2014 | Cleveland | H02M 3/3353 |
| | | | 363/21.14 |
| 2015/0244246 A1 | 8/2015 | Krueger et al. | |
| 2015/0311804 A1 | 10/2015 | Fang | |
| 2016/0181926 A1 * | 6/2016 | Ausseresse | H02M 3/33576 |
| | | | 363/21.12 |
| 2017/0085183 A1 * | 3/2017 | Notsch | H02M 3/33507 |

OTHER PUBLICATIONS

Junming Zhang, et al., "An Adaptive Blanking Time Control Scheme for an Audible Noise-Free Quasi-Resonant Flyback Converter", IEEE Transactions on Power Electronics, vol. 26, No. 10, Sep. 2011, pp. 2735-2742 (Abstract only).

Laszlo Huber, et al., "Effect of Valley Switching and Switching-Frequency Limitation on Line-Current Distortions of DCM/CCM Boundary Boost PFC Converters", IEEE Transactions on Power Electronics, vol. 24, No. 2, Feb. 2009, pp. 339-347.

* cited by examiner

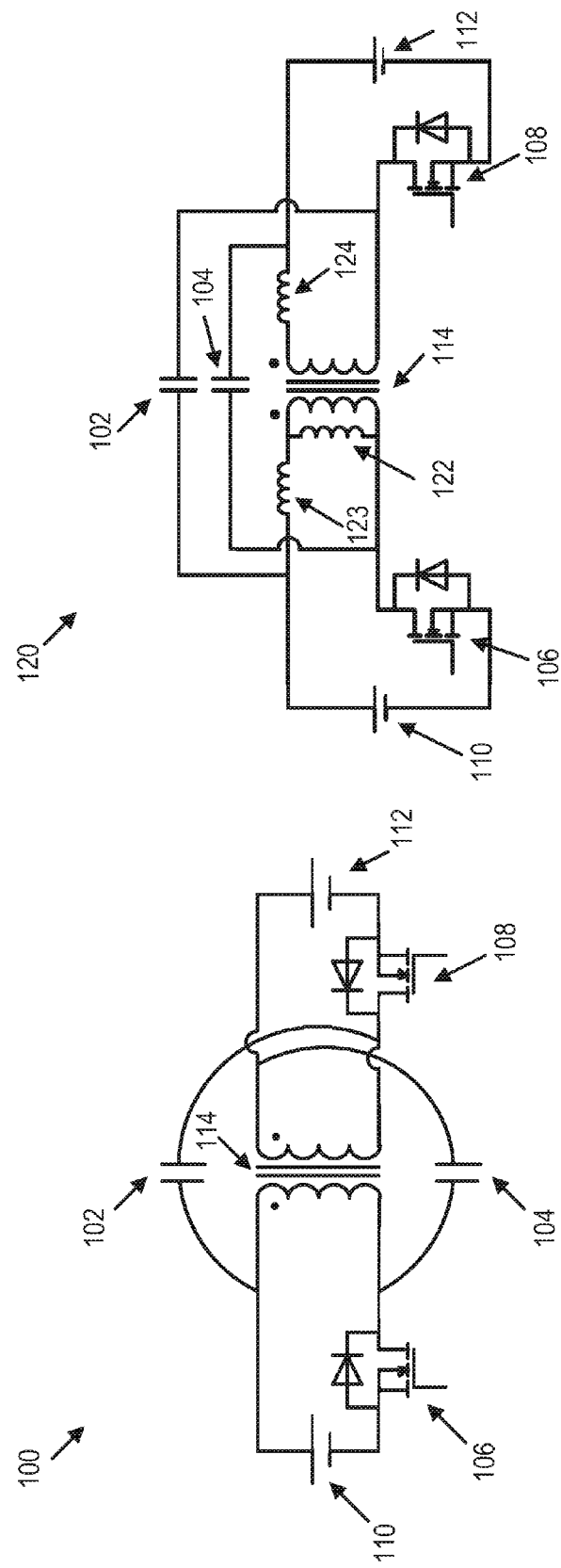

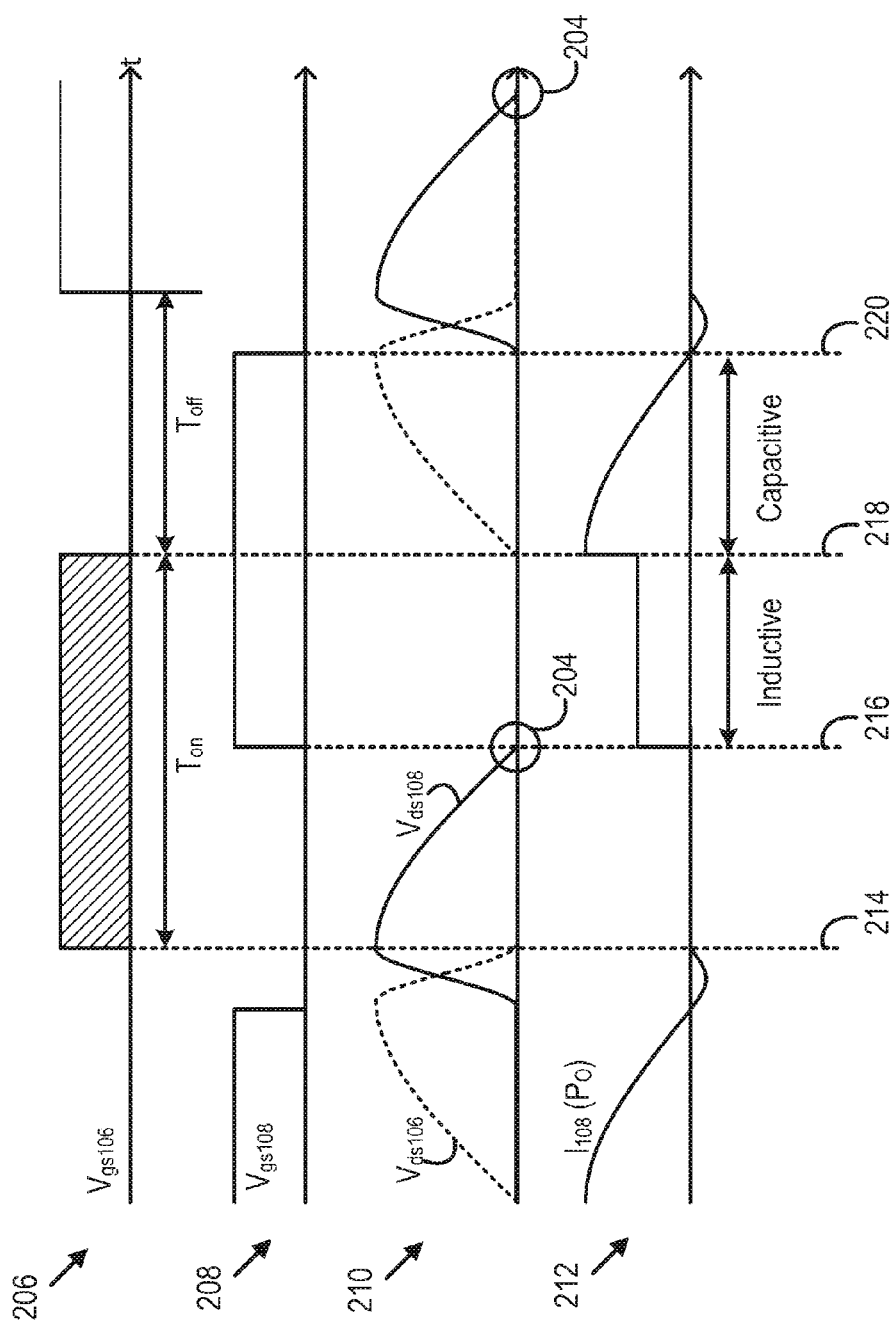

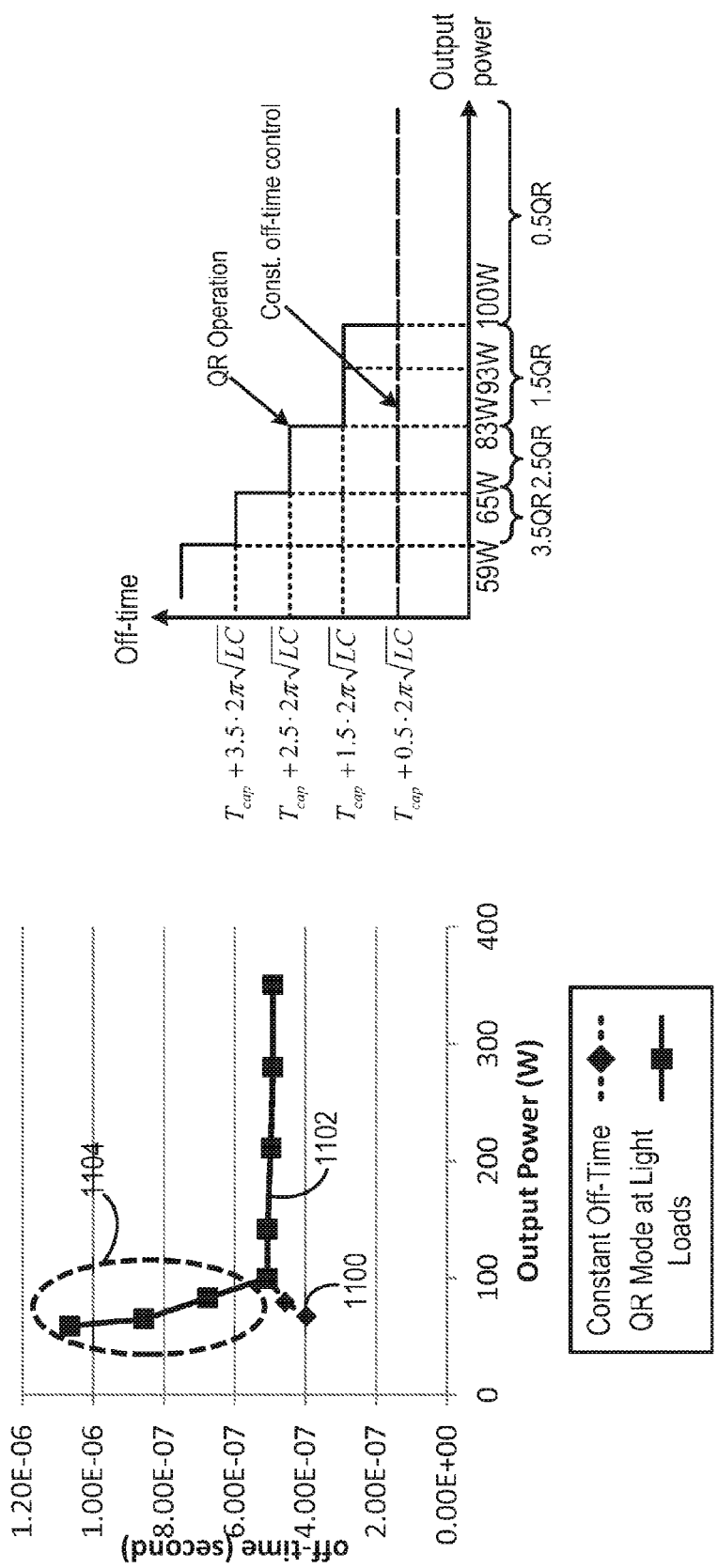

QUASI-RESONANT OPERATION OF A POWER CONVERSION CIRCUIT INCLUDING SWITCHES SYMMETRICALLY ARRANGED ABOUT A TRANSFORMER

CROSS-REFERENCE TO RELATED PATENT APPLICATIONS

The present application incorporates by reference the entire contents of U.S. patent application Ser. No. 14/504,125 having common inventorship with the present application and filed in the U.S. Patent and Trademark Office on Oct. 1, 2014.

BACKGROUND

In power conversion circuits, efficiency can be lost through switching losses and losses associated with capacitive power transfer. U.S. Pat. No. 8,324,868 to Choi et al. describes a modular energy management system that detects failure conditions in battery cells based on temperature and controls alignment of the battery modules supplying system loads so that the supply voltage is unaffected by failed battery cells.

SUMMARY

In an exemplary implementation, a power system can include DC-DC power conversion circuitry that has a first switch and a second switch on either side of a transformer. An amount of power transfer from a primary side to the secondary side of the DC-DC power conversion circuitry can be controlled based on an amount of on-time or off-time of the first switch. A power threshold can be determined corresponding to a lowest amount of power transfer that results in soft switching of the second switch with a constant off-time of the first switch. The DC-DC power conversion circuitry can be operated in a quasi-resonant mode when the amount of power transfer from the primary side to the secondary side of the DC-DC power conversion circuitry is less than the power threshold.

The DC-DC power conversion circuitry can include a first capacitor and a second capacitor cross-connected across the transformer.

The primary side and the secondary side of the DC-DC power conversion circuitry can symmetric across the transformer, and the DC-DC power conversion circuitry can be configured to perform bi-directional power transfer.

The power threshold can correspond to a highest amount of power transfer from the primary side to the secondary side of the DC-DC power conversion circuitry that includes only capacitive power transfer when the first switch is operated with the constant off-time.

The system can operate the DC-DC power conversion circuitry in a normal operation mode when the amount of power transfer from the primary side to the secondary side of the DC-DC power conversion circuitry is greater than or equal to the power threshold. The off-time of the first switch in the normal operation mode can correspond to a series resonance period plus half of a quasi-resonance period. The system can modify the amount of power transfer by increasing or decreasing the on-time of the first switch, and the off-time of the first switch can be constant in the normal operation mode. The amount of power transfer in the normal operation mode can include an amount of capacitive power transfer corresponding to the power threshold plus an amount of inductive power transfer based on the on-time of the first switch.

The system can determine one or more minimum power transfer values associated with one or more quasi-resonant power transfer ranges in the quasi-resonant mode. The one or more quasi-resonant power transfer ranges can correspond to the off-time of the first switch that includes a series resonance period plus a predetermined number of quasi-resonance periods. The system can increase the predetermined number of quasi-resonant periods included in the off-time of the first switch as the amount of power transfer from the primary side to the secondary side of the DC-DC power conversion circuitry decreases. The predetermined number of quasi-resonant periods can correspond to an integer plus half of a quasi-resonance period.

The amount of power transfer at the one or more minimum power transfer values can be associated with a first amount of on-time of the first switch and includes only capacitive power transfer. The system can increase the amount of power transfer within one of the one or more power transfer ranges to a value greater than one of the one or more minimum power threshold values by increasing the on-time of the first switch to a second amount of on-time that is greater than the first amount of on-time. The amount of power transfer associated with the second amount of on-time can include the capacitive power transfer and inductive power transfer.

In a further exemplary implementation, a process can include: controlling an amount of power transfer from a primary side to a secondary side of DC-DC power conversion circuitry including a first switch and a second switch on either side of a transformer based on an amount of on-time or off-time of the first switch; determining a power threshold corresponding to a lowest amount of power transfer that results in soft switching of the second switch with a constant off-time of the first switch; and operating the DC-DC power conversion circuitry in a quasi-resonant mode when the amount of power transfer from the primary side to the secondary side of the DC-DC power conversion circuitry is less than the power threshold. A non-transitory computer-readable storage medium including executable instructions, which when executed by circuitry, can cause the circuitry to perform the process.

In a further exemplary implementation, a system controller can include control circuitry that can control an amount of power transfer from a primary side to a secondary side of DC-DC power conversion circuitry including a first switch and a second switch on either side of a transformer based on an amount of on-time or off-time of the first switch, determine a power threshold corresponding to a lowest amount of power transfer that results in soft switching of the second switch with a constant off-time of the first switch, and operate the DC-DC power conversion circuitry in a quasi-resonant mode when the amount of power transfer from the primary side to the secondary side of the DC-DC power conversion circuitry is less than the power threshold.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1A is an exemplary schematic diagram of a DC-DC power conversion circuit;

FIG. 1B is an exemplary schematic diagram of a DC-DC power conversion circuit;

FIG. 2B is an exemplary graph of voltage and current waveforms during power transfer in a DC-DC power conversion circuit;

FIG. 11A is an exemplary graph of off-time versus output power for a DC-DC power conversion circuit;

FIG. 11B is an exemplary graph of off-time versus output power for a DC-DC power conversion circuit;

DETAILED DESCRIPTION

Figure 2A:
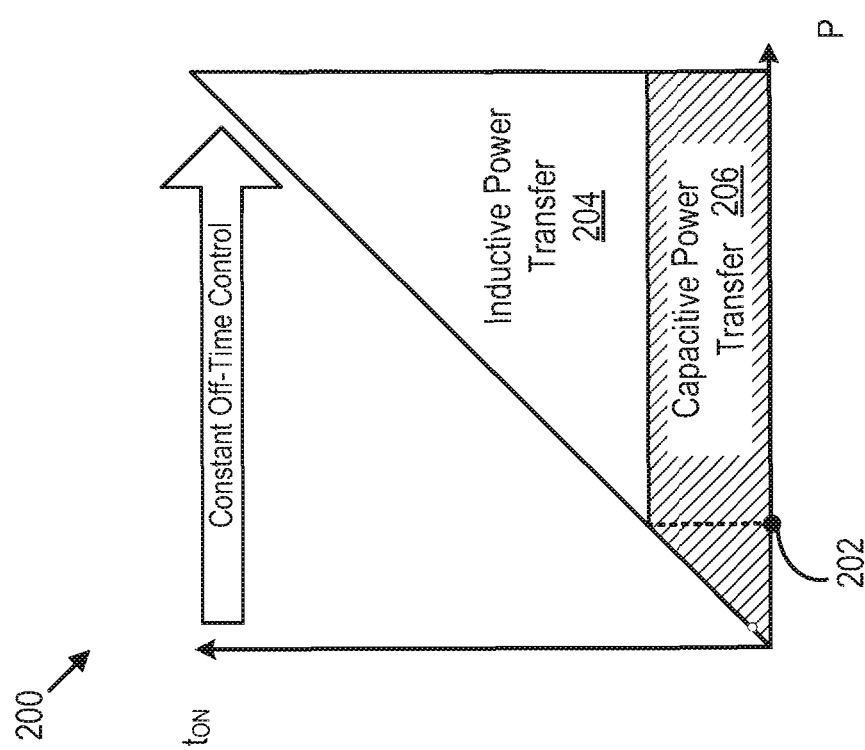
FIG. 2A is an exemplary graph of power versus switch on-time for a DC-DC power conversion circuit.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1A is an exemplary illustration of an isolated DC-DC power conversion circuit 100. The DC-DC power conversion circuit 100 can include a primary side and a secondary side that are symmetrical on either side of a magnetic core transformer 114. In an exemplary implementation, capacitors 102 and 104 can be cross-connected across the magnetic core transformer 114. The primary side can include a primary switch 106 and a primary DC power source 110, and the secondary side can include a secondary switch 108 and a secondary DC power source 112. The primary DC power source 110 and the secondary DC power source 112 can function as either a power source or a power sink depending on the direction of power transfer through the DC-DC power conversion circuit 100. In an implementation, the capacitance values of the cross-connected capacitors 102 and 104 can be equal. The primary switch 106 and the secondary switch 108 can include a MOSFET with a diode connected from the source to the drain of the MOSFET. In some aspects, the turn ratio N of the magnetic core transformer 114 is determined based on the ratio of the voltage of the primary DC power source 110 to the voltage of the secondary DC power source 112.

In certain implementations, the DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during discharge.

In order to allow the electrical components to operate as either power sources or electrical loads, the isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In addition, the switch on the side of the DC-DC power conversion circuit 100 that is receiving power can function as a synchronous rectifier to reduce circuit losses. For example, when power is transferred from the primary side to the secondary side of the DC-DC power conversion circuit 100 by cycling the primary switch 106 on and off, the secondary switch 108 can be the synchronous rectifier that is turned on and off at predetermined time intervals to provide a current path through the secondary switch 108 rather than through the parallel-connected diode. Also, the primary switch 106 and the secondary switch 108 can be operated with soft-switching, which can include zero current switching (ZCS) and/or zero voltage switching (ZVS). In some implementations, the primary switch 106 and secondary switch 108 are controlled by gate drivers that are integrated into the primary switch 106 and the secondary switch 108.

In some implementations, the DC-DC power conversion circuit 100 can also include sensors obtain sensor data from the components of the circuit, such as current sensors, voltage sensors, temperature sensors, and the like. For example, voltage sensors can measure voltage across the primary switch 106 or secondary switch 108 and can transmit the sensor data to a controller via a wired or wireless connection. The controller can control operations and detect failures of the DC-DC power conversion circuit 100 based on the received sensor data.

FIG. 1B is another exemplary illustration of an isolated DC-DC power conversion circuit 120. In addition to the components described with respect to the isolated DC-DC power conversion circuit 100 of FIG. 1A, the isolated DC-DC power conversion circuit 120 can also include an excitation inductor 122 and leakage inductors 123 and 124.

In some aspects, the leakage inductor 123 is on the primary side and the leakage inductor 124 is on the secondary side of the isolated DC-DC power conversion circuit 120. In some implementations, the magnetic core transformer 114 can be an ideal transformer, and the excitation inductor 122 and/or the leakage inductors 123 and 124 can illustrate an equivalent circuit for a real transformer. The excitation inductor 122 can be added in parallel with the primary side of the magnetic core transformer 114 in order to account for non-zero reluctance within the magnetic core transformer. In addition, the leakage inductors 123 and 124 can demonstrate how imperfect coupling within the magnetic core transformer 114 can affect the functionality of the isolate DC-DC power conversion circuit 120. In order to provide a more concise description, the isolated DC-DC power conversion circuit 100 and 120 can be used interchangeably throughout the disclosure.

FIG. 2A is an exemplary graph 200 of power transfer (P) versus switch on-time ($t_{ON}$) for the DC-DC power conversion circuit 100 with constant off-time control, which can also be referred to as a normal operation mode. In some implementations, the amount of power transferred between the primary side and the secondary side of the DC-DC power conversion circuit 100 is based on the on-time of the primary switch 106 or the secondary switch 108 while an amount of off-time remains constant. For example, for each duty cycle, the on-time of primary switch 106 can be increased to increase the amount of power transferred from the primary side to the secondary side or decreased to decrease the amount of power transferred.

During one duty cycle of the primary switch 106, power can be transferred from the primary to the secondary side of the DC-DC power conversion circuit 100 via the transformer 114, which can be referred to as inductive or magnetic power transfer. Power can also be transferred from the primary side to the secondary side via the cross-connected capacitors 102 and 104 and leakage inductors 123 and 124, which can be referred to as capacitive power transfer. For each amount of total power transferred, the graph 200 shows a corresponding amount of on-time for the primary switch 106 or secondary switch 108 as well as well as a fraction of the total amount of power transfer attributed to inductive power transfer 204 and capacitive power transfer 206.

In some implementations, when power is transferred from the primary side to the secondary side of the DC-DC power conversion circuit 100, the primary switch 106 can be interchangeably referred to as an active switch, and the secondary switch 108 can be interchangeably referred to as a passive switch. When the amount of power transferred from the primary side to the secondary side of the DC-DC power conversion circuit 100 is less than a power threshold 202, the total amount of power transfer may include only the capacitive power transfer 206, which has a lower efficiency than the inductive power transfer 204. For example, at the light loads where the amount of power transfer is less than the power threshold 202, the voltage of the secondary switch 108 may be greater than zero as the secondary switch 108 is switched on and off when operating as the synchronous rectifier, which can result in losses from hard switching. In addition, a switching frequency of the primary switch 106 is increased at light loads, which also contributes to the reduced efficiency.

In some implementations, at loads less than the power threshold 202, the DC-DC power conversion circuit 100 can be operated in a quasi-resonant mode where the duty cycle of the primary switch 106 has a varied amount of off-time. Details regarding the quasi-resonant mode of operating the DC-DC power conversion circuit 100 are discussed further herein. In addition, the implementations described herein are described with respect to power transfer from the primary side to the secondary side of the DC-DC power conversion circuit 100 but can also be similarly applied to power transfer from the secondary side to the primary side of the DC-DC power conversion circuit 100.

FIG. 2B illustrates exemplary graphs of voltage and current waveforms during power transfer in the DC-DC power conversion circuit 100 that is greater than or equal to the power threshold 202. Graph 206 illustrates a gate-source voltage of the primary switch $V_{gs106}$ that drives the primary switch 106 on or off as power is transferred from the primary side to the secondary side of the DC-DC power conversion circuit 100. For example, $V_{gs106}$ is driven high when the primary switch 106 is turned on at time 214 as shown by time period $T_{ON}$, and $V_{gs106}$ is driven low when the primary switch 106 is turned off at time 218 as shown by time period $T_{OFF}$. For amounts of power transfer that are greater than or equal to the power threshold 202, the amount of power transfer is increased by increasing $T_{ON}$, the amount of power transfer is decreased by decreasing $T_{ON}$, and $T_{OFF}$ remains constant.

Graph 208 illustrates a gate-source voltage of the secondary switch $V_{gs108}$ that drives the secondary switch 108 on or off to operate as the synchronous rectifier when power is transferred from the primary side to the secondary side of the DC-DC power conversion circuit 100. When the secondary switch 108 is operated as the synchronous rectifier, the secondary switch 108 is turned on and off at predetermined time intervals to provide a current path through the secondary switch 108 rather than through the parallel-connected diode. For example, the secondary switch is turned on at time 216 and off at time 220.

Graph 210 illustrates a drain-source voltage of the primary switch $V_{ds106}$ and a drain-source voltage of the secondary switch $V_{ds108}$. The drain-source voltages of the primary switch $V_{ds106}$ and secondary switch $V_{ds108}$ represent the voltages across the primary switch 106 or the secondary switch 108 as power is transferred from the primary side to the secondary side of the DC-DC power conversion circuit 100. For example, $V_{ds106}$ is approximately zero at times 214 and 218 when the primary switch 106 is turned on and off, which represents ZVS of the primary switch 106. In addition, $V_{ds108}$ is approximately zero at times 216 and 220 when the secondary switch 108 is turned on and off, which represents ZVS of the secondary switch 108. For example, points 204 on the $V_{ds108}$ curve represent ZVS turn-on of the secondary switch 108.

Graph 212 illustrates a current through the secondary switch $I_{108}$, which also corresponds to an amount of power ($P_O$) transferred from the primary side to the secondary side of the DC-DC power conversion circuit 100. For example, the amount of power transferred can be equal to an area under a curve of the current through the secondary switch $I_{108}$. As shown in the graph 212, between times 216 and 218, inductive power transfer occurs, which can also be referred to as magnetic power transfer, and between times 218 and 220, capacitive power transfer occurs. As the amount of power transfer decreases, the amount of time between time 216 and 218 is reduced, resulting in a reduction in the amount of inductive power transfer.

Figure 3:
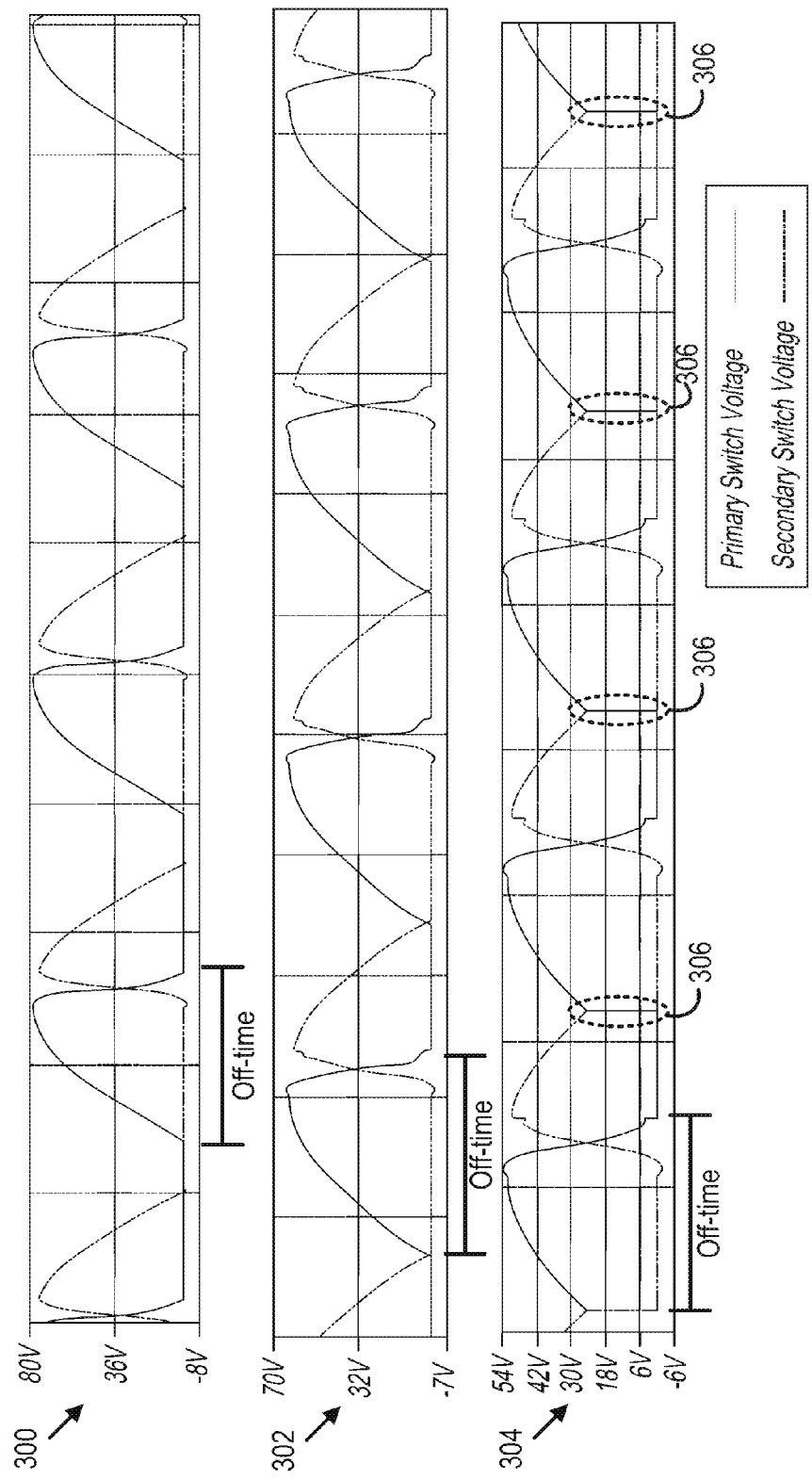
FIG. 3 is an exemplary graph of switch voltages during power transfer in a DC-DC power conversion circuit.

FIG. 3 is an exemplary graph of voltages of the primary switch 106 and the secondary switch 108 during power transfer in the DC-DC power conversion circuit 100 in a normal operation mode with constant off-time control. Graph 300 corresponds 140 Watts (W) of power transfer from the primary side to the secondary side of the DC-DC power conversion circuit 100, graph 302 corresponds to 100 W of power transfer, and graph 304 corresponds to 67 W of power transfer. In addition, the power threshold 202 is approximately 100 W, according to one implementation. For each amount of power transfer in the graphs 300, 302, and 304, the off-time for each duty cycle of the primary switch 106 remains constant, and the amount of on-time is varied. For example, the on-time for the primary switch 106 for 140 W of power transfer is greater than the on-times for 100 W of power transfer and 67 W of power transfer. In addition, the constant off-time of the primary switch 106 can correspond to instances when the voltage of the primary switch 106 is non-zero, and the on-time corresponds to when the voltage of the primary switch 106 is approximately equal to zero.

The graph 302 corresponds to the voltages of the primary switch 106 and secondary switch 108 when the amount of power transfer from the primary side to the secondary side of the DC-DC power conversion circuit 100 is equal to the power threshold 202. In some implementations, the power threshold 202 corresponds to a highest amount of power transfer from the primary side to the secondary side of the DC-DC power conversion circuit 100 that includes the capacitive power transfer but not the inductive power transfer. In addition, the power threshold 202 corresponds to a lowest amount of power transfer where the primary switch 106 has the constant off-time and is still able to maintain soft switching of the secondary switch 108. In one implementation, the soft switching of the secondary switch 108 refers to zero voltage switching (ZVS) of the secondary switch 108 as the secondary switch 108 is turned on and off when functioning as the synchronous rectifier.

The graph 304 corresponds to the voltages of the primary switch 106 and secondary switch 108 when the amount of power transfer from the primary side to the secondary side of the DC-DC power conversion circuit 100 is 67 W, which is less than the power threshold 202. The total amount of power transferred includes only capacitive power transfer via the capacitors 102 and 104 and the leakage inductors 123 and 124. In addition, hard switching points 306 in the duty cycles that correspond to a time when the primary switch 106 is turned off and the secondary switch 108 is turned on. At the hard switching points 306, the voltage of the secondary switch 108 is greater than zero, which causes an abrupt drop in the voltage of the secondary switch 108, which results in the hard switching. As the amount of power transfer is reduced below the power threshold 202 with the constant off-time control, the ZVS of the secondary switch 108 can be degraded, which results in a loss of efficiency.

Figure 4:
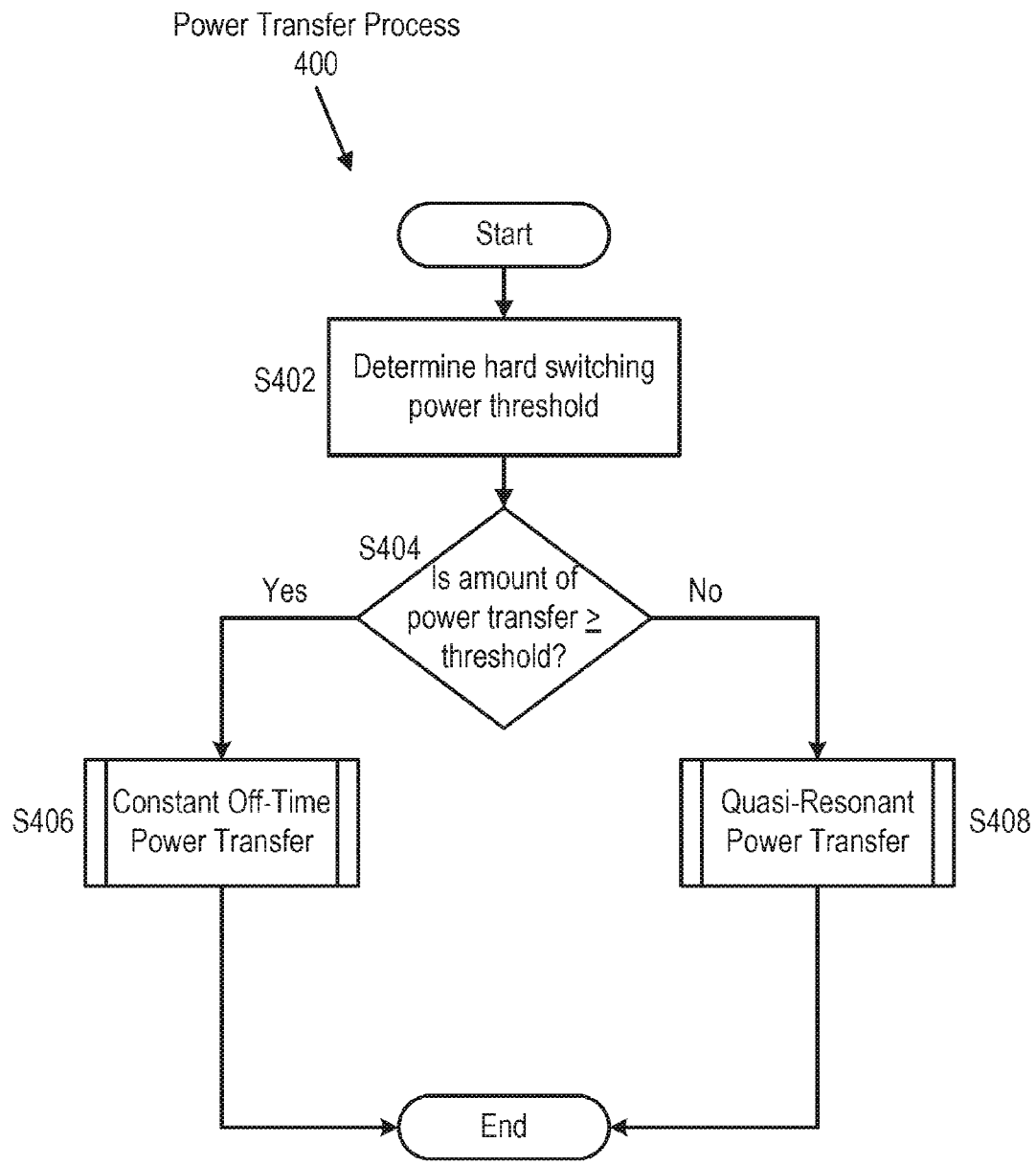
FIG. 4 is an exemplary flowchart of a power transfer process.

FIG. 4 is an exemplary flowchart of a power transfer process 400. The power transfer process 400 can be performed by a controller with one or more electronic control units (ECUs) that include control circuitry. The ECUs can process sensor data, display electric power module information to a user, and send control signals to actuators that activate components of the DC-DC power conversion circuit 100 as well as power sources or electrical loads connected to the DC-DC power conversion circuit 100. In some implementations, the actuators send control signals to the gate drivers for the primary switch 106 and secondary switch 108 to control direction of power transfer through the DC-DC power conversion circuit 100 as well as the on-time and off-time of the primary switch 106 or secondary switch. The ECUs can also align a plurality of DC-DC power conversion circuits to perform power transfer among a one or more sources and/or loads within an electric vehicle (EV) power transfer system. In some implementations, the power transfer process 400 is performed when an amount of power output by the DC-DC power conversion circuit 100 to one or more loads changes by more than a predetermined amount.

At step S402, the control circuitry determines a power threshold for the DC-DC power conversion circuit 100. In some implementations, the power threshold 202 corresponds to a highest amount of power transfer from the primary side to the secondary side of the DC-DC power conversion circuit 100 that includes the capacitive power transfer with no inductive power transfer when the primary switch 106 has the constant off-time. In addition, the power threshold 202 corresponds to a lowest amount of power transfer where the primary switch 106 has the constant off-time and is still able to maintain soft switching of the secondary switch 108. For example, the power threshold may be 100 W according to one implementation.

At step S402, the control circuitry determines whether an amount of power transfer between the primary and secondary sides of the DC-DC power conversion circuit 100 is greater than or equal to the power threshold 202. In some implementations, the amount of power transfer is based on the size, type, and configuration of the loads that receive power from the DC-DC power conversion circuit 100. If the amount of power transfer is greater than or equal to the power threshold 202, resulting in a "yes" at step S404, then step S406 is performed. Otherwise, if the amount of power transfer is less than the power threshold 202, resulting in a "no" at step S404, then step S408 is performed.

At step S406, if the amount of power transfer is greater than or equal to the power threshold 202, then the power transfer between the primary and secondary sides of the DC-DC power conversion circuit 100 is controlled with the constant off-time control, which can also be referred to as a normal operation mode. In some implementations, the control circuitry can operate the primary switch 106 with soft switching so that the primary switch 106 is turned on when the current on the primary side of the isolated DC-DC power conversion circuit 100 is approximately zero in order to implement zero current switching (ZCS). Likewise, the primary switch 106 is turned off when the voltage on the primary side is approximately zero to implement zero voltage switching (ZVS). In addition, the voltage at the secondary switch 108 is also equal to approximately zero when the secondary switch 108 is turned on and off to operate as the synchronous rectifier so that the secondary switch 108 also experiences ZVS. The total amount of power transfer in the normal operation mode includes an amount of capacitive power transfer corresponding to the power threshold plus an amount of inductive power transfer based on the on-time of the primary switch 106. Details regarding the constant off-time control are discussed further herein.

At step S408, if the amount of power transfer is less than the power threshold, then the power transfer between the primary and secondary sides of the DC-DC power conversion circuit 100 is operated in a quasi-resonant mode where the amount of on-time and off-time of the primary switch 106 can be modified based on the amount of power transfer. In some implementations, the off-time of the primary switch 106 is varied in order to maintain soft switching of the secondary switch 108 by incorporating one or more quasi-resonance periods into the off-time of the primary switch 106. Details regarding the quasi-resonant mode are discussed further herein.

Figure 5:
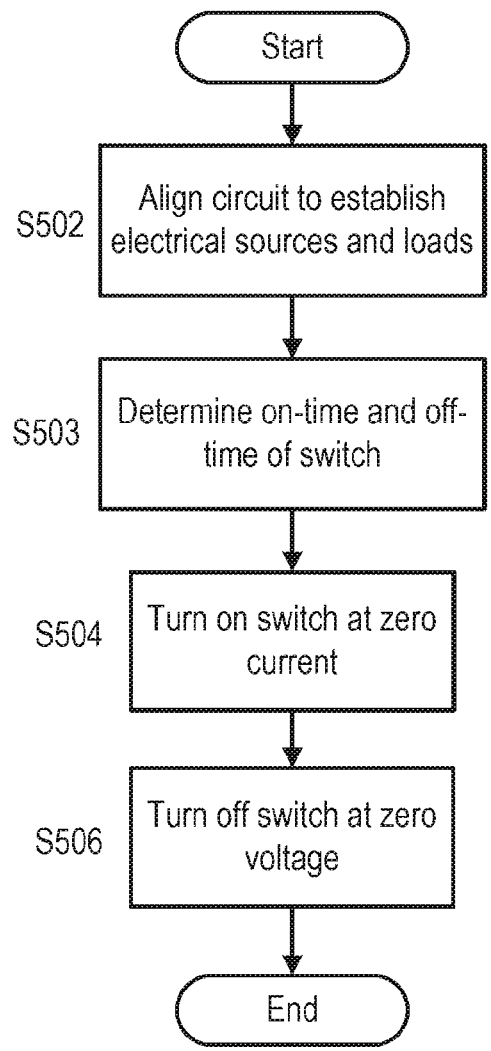
FIG. 5 is an exemplary flowchart of a constant off-time power transfer process.

FIG. 5 is an exemplary flowchart of a constant off-time power transfer process 500, which can also be referred to as a normal operation power control process. The constant off-time power transfer process 500 can be implemented by the control circuitry when the amount of power transfer between the primary and secondary sides of the DC-DC power conversion circuit 100 is greater than or equal to the power threshold 202. In addition, the amount of power transfer corresponds to the on-time of the primary switch 106 when power is transferred from the primary side to the secondary side of the DC-DC power conversion circuit 100. The constant off-time power transfer process 500 is described with respect to the DC-DC power conversion circuit 100 but could also be implemented on other types and configurations of power conversion circuits. During the constant off-time power transfer process 500, the total amount of power transferred includes both inductive and capacitive power transfer.

At step S502, control signals are sent to align at least one DC-DC power conversion circuit 100 based on a desired direction of power transfer. In some implementations, the electrical components are connected at the primary DC power source 110 and secondary DC power source 112 and can function as either power sources or electrical loads. For example, a battery cell in an electrical system of an electric vehicle (EV) can function as a power source to power electrical components of a vehicle, such as brakes, audio systems, and the like. The battery cell can also function as an electrical load during battery cell balancing among a plurality of battery cells. The control circuitry can send control signals to voltage sensors, current sensors, and timers as well as to the primary switch 106 and the secondary switch 108 to align the DC-DC power conversion circuit 100 for the desired direction of power transfer.

At step S503, the control circuitry determines the on-time and off-time for the primary switch 106 and the secondary switch 108 of the DC-DC power conversion circuit 100. In some implementations, the control circuitry can determine the amount on-time per duty cycle of the primary switch 106 based on power and voltage characteristics of the power sources and electrical loads. For example, the amount of on-time of the primary switch 106 can correspond to the load size, type, and configuration as well as a state of charge (SOC) or time of life of the power cell, such as one or more battery cells of an energy module. In addition, the control circuitry can determine an amount of constant off-time based on resonance properties of the DC-DC power conversion circuit 100 that allow for soft switching 106 of the primary switch 106 and secondary switch 108 as the primary switch 106 is cycled on and off. For example, the resonance properties can include a resonance frequency and period of the DC-DC power conversion circuit 100. In one implementation, the amount of constant off-time $T_{off}$ can correspond to a series resonance period $T_{cap}$ when the capacitive power transfer occurs plus half of a quasi-resonance period as described by Equation (1), where L represents a lumped leakage inductance of the transformer 114, and C represents a lumped output of the switches.

$$T_{off} = T_{cap} + 0.5 \times 2\pi\sqrt{LC} \quad (1)$$

In addition, the control circuitry can determine the on-time and off-time of the secondary switch 108 that functions as the synchronous rectifier while still maintaining the soft-switching. For example, the on-time of the secondary switch 108 can correspond to a time period where the drain-source voltage of the secondary switch $V_{ds108}$ is approximately equal to zero.

At step S504, if power is being transferred from the primary side to the secondary side of the DC-DC power conversion circuit 100, a control signal is sent to turn on the primary switch 106 when the current through the primary switch 106 is zero to implement ZCS. The control circuitry can receive sensor data relating to current at the primary switch 106 to determine when to send the control signal to turn on the primary switch 106. In some implementations, the control circuitry can determine when to turn on and off the primary switch 106 based on the capacitance of capacitors 102 and 104, inductance of the leakage inductors 123 and 124, turn ratio of the inductor 114, and values of other circuit components. In an implementation, the control signal is sent to a gate driver circuit that turns on the primary switch 106. In some aspects, the gate driver circuits can be integrated into the primary switch 106 and the secondary switch 108. The time at which the primary switch 106 is turned on can correspond to the beginning of the active signal time for the duty cycle of the primary switch 106. In addition, the secondary switch 108 can be turned on when $V_{ds108}$ decreases to approximately zero to operate as the synchronous rectifier when power is transferred from the primary side to the secondary side of the DC-DC power conversion circuit 100.

The amount of power transferred from the primary side to the secondary side of the DC-DC power conversion circuit 100 can be modified by changing an amount of on-time of the primary switch 106. To increase the amount of power transferred from the primary side to the secondary side of the DC-DC power conversion circuit 100, the on-time of the primary switch 106 can be increased. To decrease the amount of power transferred from the primary side to the secondary side of the DC-DC power conversion circuit 100, the on-time of the primary switch 106 can be decreased. In some implementations, when the amount of power transfer is increased or decreased by modifying the amount of on-time in the normal operation mode, the amount of off-time for the primary switch 106 can remain constant. The quantity of power that is transferred from the primary side to the secondary side of the isolated DC-DC power conversion circuit 100 can also be determined based on the power and voltage characteristics of the electrical components in the electrical system, such as the voltage and current of battery cells, loads, and the like.

At step S506, a control signal is sent to turn off the primary switch 106 to implement ZVS when the voltage at the primary switch 106 is zero, which can end the active signal time for the duty cycle of the primary switch 106. The control circuitry can receive sensor data relating to voltage at the primary switch 106 to determine when to send the control signal to turn off the primary switch 106. In some implementations, the control circuitry can determine when to turn on and off the primary switch 106 based on the capacitance of capacitors 102 and 104, inductance of the leakage inductors 123 and 124, turn ratio of the inductor 114, and values of other circuit components. In some implementations, capacitive power transfer can occur from the primary side to the secondary side of the isolated DC-DC power conversion circuit 120 through the cross-connected capacitors 102 and 104 until the current through the inductors 123 and 124 goes to zero and the capacitors 102 are negatively charged. The primary switch 106 can be turned on again to commence another duty cycle when the amount of constant off-time has passed. In addition, the secondary switch 108 can be turned off when the voltage across the secondary switch 108 is approximately zero in order to maintain the ZVS for the secondary switch 108.

Figure 6:
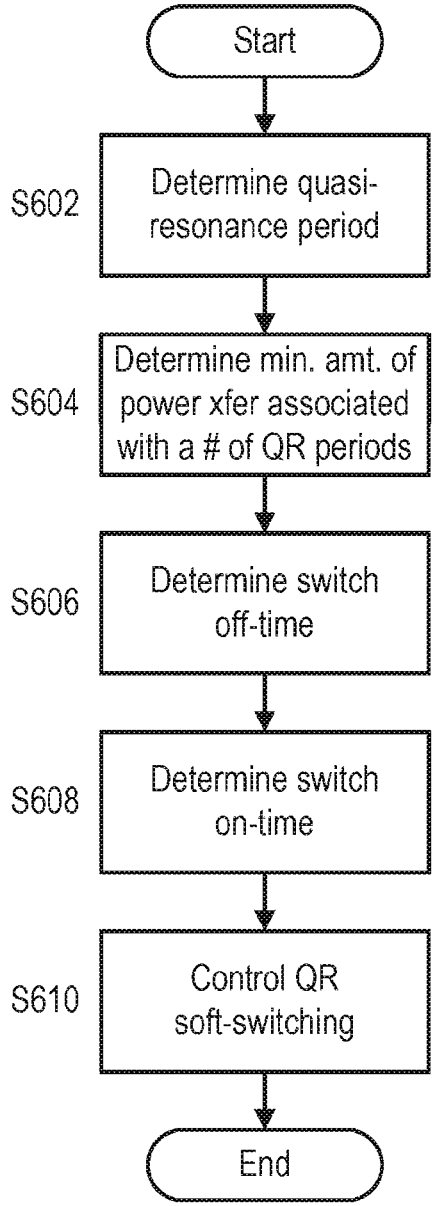
FIG. 6 is an exemplary flowchart of a quasi-resonant power transfer process.

FIG. 6 is an exemplary flowchart of a quasi-resonant power transfer process 600. The quasi-resonant power transfer process 600 can be implemented by the control circuitry when the amount of power transfer between the primary and secondary sides of the DC-DC power conversion circuit 100 is less than the power threshold 202. In addition to modifying the amount of on-time of the primary switch 106 to modify the amount of power transfer, the amount of off-time of the primary switch 106 can also be varied to incorporate one or more quasi-resonance periods. Modifying the off-time of the primary switch 106 can increase efficiency at light loads where hard switching occurs when the off-time is held constant. The quasi-resonant power transfer process 600 is described with respect to the DC-DC power conversion circuit 100 but could also be implemented on other types and configurations of power conversion circuits.

At step S602, the control circuitry determines a quasi-resonance period for the DC-DC power conversion circuit 100. In some implementations, quasi-resonance refers to signal ringing that occurs in the voltage of the primary switch 106 and/or secondary switch 108 after a period of series resonance occurs during the off-time of the primary switch 106. In addition, the series resonance that occurs during the off-time of the primary switch 106 corresponds to a period of time during the duty cycle of the primary switch 106 when the capacitive power transfer occurs. Both the series resonance and the quasi-resonance can be produced due to the current that flows through the leakage inductors 123 and 124 and capacitors 102 and 104 during the off-time of the primary switch 106. In some implementations, the signal ringing occurs at a frequency that can be determined by the control circuitry based on operational characteristics such as the inductance of the leakage inductors 123 and 124, capacitance of the capacitors 102 and 104, voltage of the primary DC power source 110 (input voltage), or voltage of the secondary DC power source 112 (output voltage). The control circuitry can determine the quasi-resonance period based on sensor data received from the voltage or current sensors of the DC-DC power conversion circuit 100.

At step S604, the control circuitry determines a minimum amount of power transfer associated with one or more quasi-resonance periods incorporated into the off-time of the primary switch 106. In some implementations, the amount of power transfer from the primary side to the secondary side of the DC-DC power conversion circuit 100 decreases as the amount of off-time of the primary switch 106 is increased, and the amount of power transfer increases as the amount of off-time of the primary switch 106 is decreased. The amount of off-time Toff in the quasi-resonant mode can be described by Equation (2), where L represents a lumped leakage inductance of the transformer 114, C represents a lumped output of the switches, and n represents a number of quasi-resonance periods.

$$T_{off} = T_{cap} + n \times 2\pi\sqrt{LC} \qquad (2)$$

In some aspects, the number n of quasi-resonance periods can be integers plus half of a quasi-resonance period, such as 0.5, 1.5, 2.5, 3.5, or more quasi-resonance periods. In addition, the term $2\pi\sqrt{LC}$, corresponds to one quasi-resonance period. In some implementations, other values of n, such as 0.7 or 1.8, can result in a loss of soft-switching for the secondary switch 108.

In addition, the control circuitry can determine a minimum amount of power transfer associated with various off-times of the primary switch 106 that incorporate predetermined numbers of quasi-resonance periods. The minimum amount of power transfer for each of the off-times can correspond to a total amount of power transfer that is entirely capacitive power transfer with no inductive power transfer. For example, 0.5 quasi-resonance periods can have a minimum amount power transfer of 100 W, which is the power threshold 202. 1.5 quasi-resonance periods can have a minimum amount of power transfer of 83 W, 2.5 quasi-resonance periods can have a minimum amount of power transfer of 65 W, 3.5 quasi-resonance periods can have a minimum amount of power transfer of 59 W, and so on.

At step S606, the off-time for the primary switch 106 is determined based on the amount of power transfer from the primary side to the secondary side of the DC-DC power conversion circuit 100. In the quasi-resonant mode, the control circuitry determines an off-time for the primary switch 106 that corresponds to a series resonance period that occurs when the primary switch 106 is turned off plus a predetermined number of quasi-resonant periods. In addition, the amount of off-time of the primary switch 106 can be increased or decreased inversely proportional to the amount of power transfer. For example, as the amount of power transfer from the primary side to the secondary side of the DC-DC power conversion circuit 100 decreases, the number of quasi-resonance periods incorporated into the off-time of the primary switch 106 increases. Including the quasi-resonance periods in the off-time of the primary switch 106 allows soft-switching of the primary switch 106 and the secondary switch 108 to be achieved.

In some implementations, the control circuitry can determine one or more ranges of power transfer associated with each number of quasi-resonance periods based on the minimum amounts of power transfer determined at step S604. For example, amounts of power transfer that are greater than or equal to 100 W can have an amount of off-time that corresponds to n=0.5 quasi-resonance periods. Amounts of power transfer that are greater than or equal to 83 W and less than 100 W can have an off-time that corresponds to n=1.5 quasi-resonance periods. Amounts of power transfer that are greater than or equal to 65 W and less than 83 W can have an off-time that corresponds to n=2.5 quasi-resonance periods. Amounts of power transfer that are greater than or equal to 59 W and less than 65 W can have an off-time that corresponds to n=3.5 quasi-resonance periods. The control circuitry can also determine power transfer ranges associated with greater numbers of quasi-resonance periods, such as 4.5, 5.5, 6.5, and so on.

At step S608, the on-time for the primary switch 106 is determined based on the amount of power transfer from the primary to the secondary side of the DC-DC power conversion circuit 100. In some implementations, when the amount of power transfer corresponds to the minimum power transfer value of one of the power transfer ranges determined at step S606, the amount of on-time of the primary switch can be equal to a predetermined value where the primary switch 106 maintains soft-switching, and the primary switch 106 is turned off when the secondary switch 108 is turned on. In addition, when the amount of power transfer corresponds to a minimum power transfer value of one of the power transfer ranges, the total amount of power transfer is capacitive power transfer with no inductive power transfer. If the amount of power transfer is greater than the minimum amount of power transfer in one of the power transfer ranges, then the on-time of the primary switch 106 can be increased to overlap with the on-time of the secondary switch 108, resulting in the total amount of power transfer including both inductive and capacitive power transfer.

At step S610, the control circuitry controls the power transfer from the primary side to the secondary side of the DC-DC power conversion circuit 100 using quasi-resonant switching of the primary switch 106 to maintain the soft-switching of primary switch 106 and the secondary switch 108. The control circuitry issues control signals to a gate driver circuit to turn on and turn off the primary switch 106 to achieve the on-time determined at step S608 and the off-time determined at step S606.

Figure 7A:
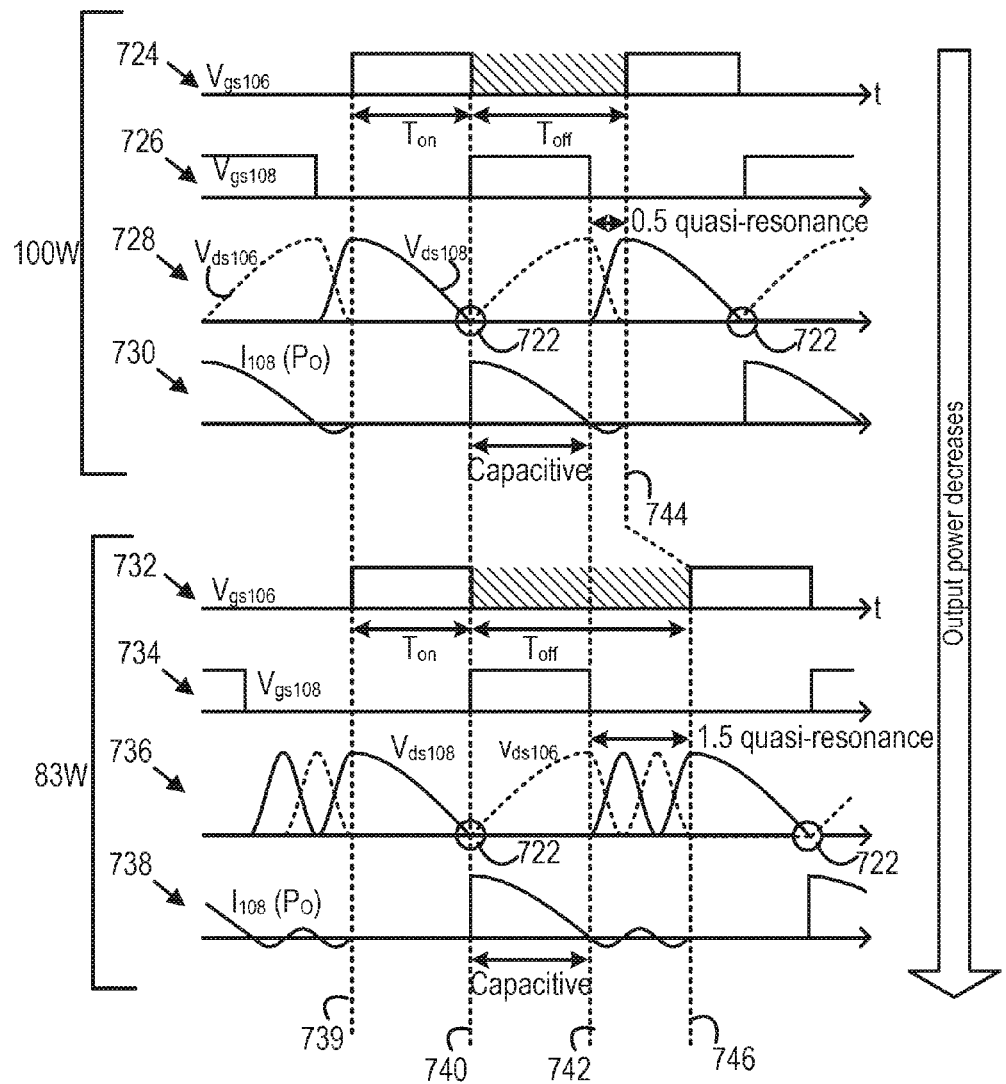
FIG. 7A is an exemplary graph of voltage and current waveforms during power transfer in a DC-DC power conversion circuit.

FIG. 7A illustrates exemplary graphs of voltage and current waveforms during power transfer in the quasi-resonant mode of the DC-DC power conversion circuit 100 where the amount of power transfer is equal to the minimum power transfer value of one of the power transfer ranges. For example, graphs 724, 726, 728, and 730 are associated with 100 W of power transfer that includes 0.5 quasi-resonance periods in the off-time of the primary switch 106, and graphs 732, 734, 736, and 738 are associated with 83 W of power transfer that includes 1.5 quasi-resonance periods in the off-time of the primary switch 106.

The graph 724 illustrates the gate-source voltage of the primary switch $V_{gs106}$ that drives the primary switch 106 on or off as 100 W of power is transferred from the primary side to the secondary side of the DC-DC power conversion circuit 100. For example, $V_{gs106}$ is driven high when the primary switch 106 is turned on at time 214 as shown by time period $T_{ON}$, and $V_{gs106}$ is driven low when the primary switch 106 is turned off at time 218 as shown by time period $T_{OFF}$. The off-time $T_{OFF}$ corresponds to a time period from time 740 to 744 that includes the series resonance period $T_{CAP}$ plus 0.5 quasi-resonance periods.

The graph 726 illustrates the gate-source voltage of the secondary switch $V_{gs108}$ that drives the secondary switch 108 on or off to operate as the synchronous rectifier when power is transferred from the primary side to the secondary side of the DC-DC power conversion circuit 100. When the secondary switch 108 is operated as the synchronous rectifier, the secondary switch 108 is turned on and off at predetermined time intervals to provide a current path through the secondary switch 108 rather than through the parallel-connected diode. For example, the secondary switch is turned on at time 740 and off at time 742. In some implementations, the time 740 when the secondary switch 108 is turned on corresponds to the time that the primary switch 106 is turned off.

The graph 728 illustrates the drain-source voltage of the primary switch $V_{ds106}$ and the drain-source voltage of the secondary switch $V_{ds108}$ for 100 W of power transfer, which is the minimum power transfer value of the power transfer range that includes 0.5 quasi-resonance periods in the off-time of the primary switch 106. For example, $V_{ds106}$ is approximately zero at times 739 and 740 when the primary switch 106 is turned on and off, which represents the ZVS of the primary switch 106. As can be seen from the $V_{ds106}$ curve, the off-time of the primary switch 106 includes a series resonance period plus 0.5 quasi-resonance periods. In addition, $V_{ds108}$ is approximately zero at times 740 and 742 when the secondary switch 108 is turned on and off, which represents the ZVS of the secondary switch 108. For example, points 722 on the $V_{ds108}$ curve represent the ZVS turn-on of the secondary switch 108.

The graph 730 illustrates a current through the secondary switch $I_{108}$, which also corresponds to an amount of power ($P_O$) transferred from the primary side to the secondary side of the DC-DC power conversion circuit 100. As shown in the graph 730, the total amount of power transfer includes capacitive power transfer, which occurs between times 740 and 742.

The graph 732 of the gate-source voltage of the primary switch $V_{gs106}$ illustrates that as the amount of power transfer is reduced to 83 W, the amount of off-time of the primary switch is greater than the off-time for 100 W of power transfer. The off-time $T_{OFF}$ corresponds to a time period from time 740 to 746 that includes the series resonance period $T_{CAP}$ plus 1.5 quasi-resonance periods.

The graph 734 illustrates the gate-source voltage of the secondary switch $V_{gs108}$ that drives the secondary switch 108 on or off to operate as the synchronous rectifier when power is transferred from the primary side to the secondary side of the DC-DC power conversion circuit 100. In some implementations, the amount of on-time of the secondary switch 108 for 83 W of power transfer is equal to the amount of on-time of the secondary switch for 100 W of power transfer.

The graph 736 illustrates the drain-source voltage of the primary switch $V_{ds106}$ and the drain-source voltage of the secondary switch $V_{ds108}$ for 83 W of power transfer, which is the minimum power transfer value of the power transfer range that includes 1.5 quasi-resonance periods in the off-time of the primary switch 106. For example, $V_{ds106}$ is approximately zero at times 739 and 740 when the primary switch 106 is turned on and off, which represents the ZVS of the primary switch 106. As can be seen from the $V_{ds106}$ curve, the off-time of the primary switch 106 includes a series resonance period plus 1.5 quasi-resonance periods. In addition, $V_{ds108}$ is approximately zero at times 740 and 742 when the secondary switch 108 is turned on and off, which represents the ZVS of the secondary switch 108. For example, points 722 on the $V_{ds108}$ curve represent the ZVS turn-on of the secondary switch 108.

The graph 738 illustrates a current through the secondary switch $I_{108}$, which also corresponds to an amount of power ($P_O$) transferred from the primary side to the secondary side of the DC-DC power conversion circuit 100. As shown in the graph 738, the total amount of power transfer includes capacitive power transfer, which occurs between times 740 and 742. Even though the amount of on-time for the primary switch 106 is constant for 100 W and 83 W of power transfer, the amount of power transfer can be reduced by extending the amount of off-time of the primary switch 106.

Figure 7B:
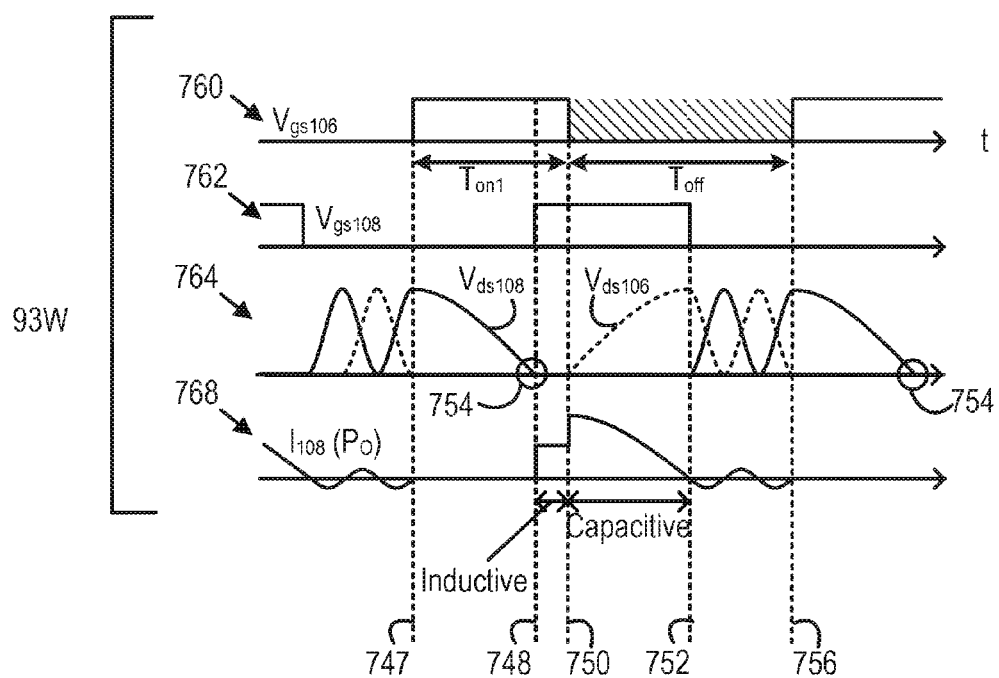
FIG. 7B is an exemplary graph of voltage and current waveforms during power transfer in a DC-DC power conversion circuit.

FIG. 7B illustrates exemplary graphs of voltage and current waveforms during power transfer in the quasi-resonant mode of the DC-DC power conversion circuit 100. The graphs correspond to 93 W of power transfer, which is within the power transfer range of 83 W to less than 100 W that includes 1.5 quasi-resonance periods in the off-time of the primary switch 106. The amount of on-time of the primary switch 106 can be increased so that the total amount of power transfer includes both inductive and capacitive power transfer.

For example, graph 760 illustrates the gate-source voltage of the primary switch $V_{gs106}$ that drives the primary switch 106 on or off as 93 W of power is transferred from the primary side to the secondary side of the DC-DC power conversion circuit 100. For example, $V_{gs106}$ is driven high when the primary switch 106 is turned on at time 747 as shown by time period $T_{ON1}$, which is greater than the on-time $T_{ON}$ of the primary switch 106 for 83 W of power transfer. Also, the on-time $T_{ON1}$ overlaps with the on-time of the secondary switch 108 between times 748 and 750. $V_{gs106}$ is driven low when the primary switch 106 is turned off at time 750 as shown by time period $T_{OFF}$. The off-time $T_{OFF}$ corresponds to a time period from time 750 to 756 that includes the series resonance period $T_{CAP}$ from times 750 to 752 plus 1.5 quasi-resonance periods from times 752 to 756.

Graph 762 illustrates the gate-source voltage of the secondary switch $V_{gs108}$ that drives the secondary switch 108 on or off to operate as the synchronous rectifier when power is transferred from the primary side to the secondary side of the DC-DC power conversion circuit 100. For example, the secondary switch 108 is turned on at time 748 and turned off at time 752 in order to provide the ZVS for the secondary switch 108.

Graph 764 illustrates the drain-source voltage of the primary switch $V_{ds106}$ and the drain-source voltage of the secondary switch $V_{ds108}$ for 93 W of power transfer. For example, $V_{ds106}$ is approximately zero at times 747 and 750 when the primary switch 106 is turned on and off, which represents the ZVS of the primary switch 106. As can be seen from the $V_{ds106}$ curve, the off-time of the primary switch 106 includes a series resonance period from time 750 to 752 plus 1.5 quasi-resonance periods from time 752 to time 756. In addition, $V_{ds108}$ is approximately zero at times 748 and 752 when the secondary switch 108 is turned on and off, which represents the ZVS of the secondary switch 108. For example, points 754 on the $V_{ds108}$ curve represent the ZVS turn-on of the secondary switch 108.

Graph 768 illustrates a current through the secondary switch $I_{108}$, which also corresponds to an amount of power ($P_O$) transferred from the primary side to the secondary side of the DC-DC power conversion circuit 100. The total amount of power transfer includes 10 W of inductive power transfer between times 748 and 750 and 83 W of capacitive power transfer between times 752 for a total amount of power transfer of 93 W. The increased on-time of the primary switch 106 from $T_{ON}$ for 83 W of power transfer to $T_{ON1}$ for 93 W of power transfer provides for the 10 W of additional inductive power transfer.

Figure 7C:
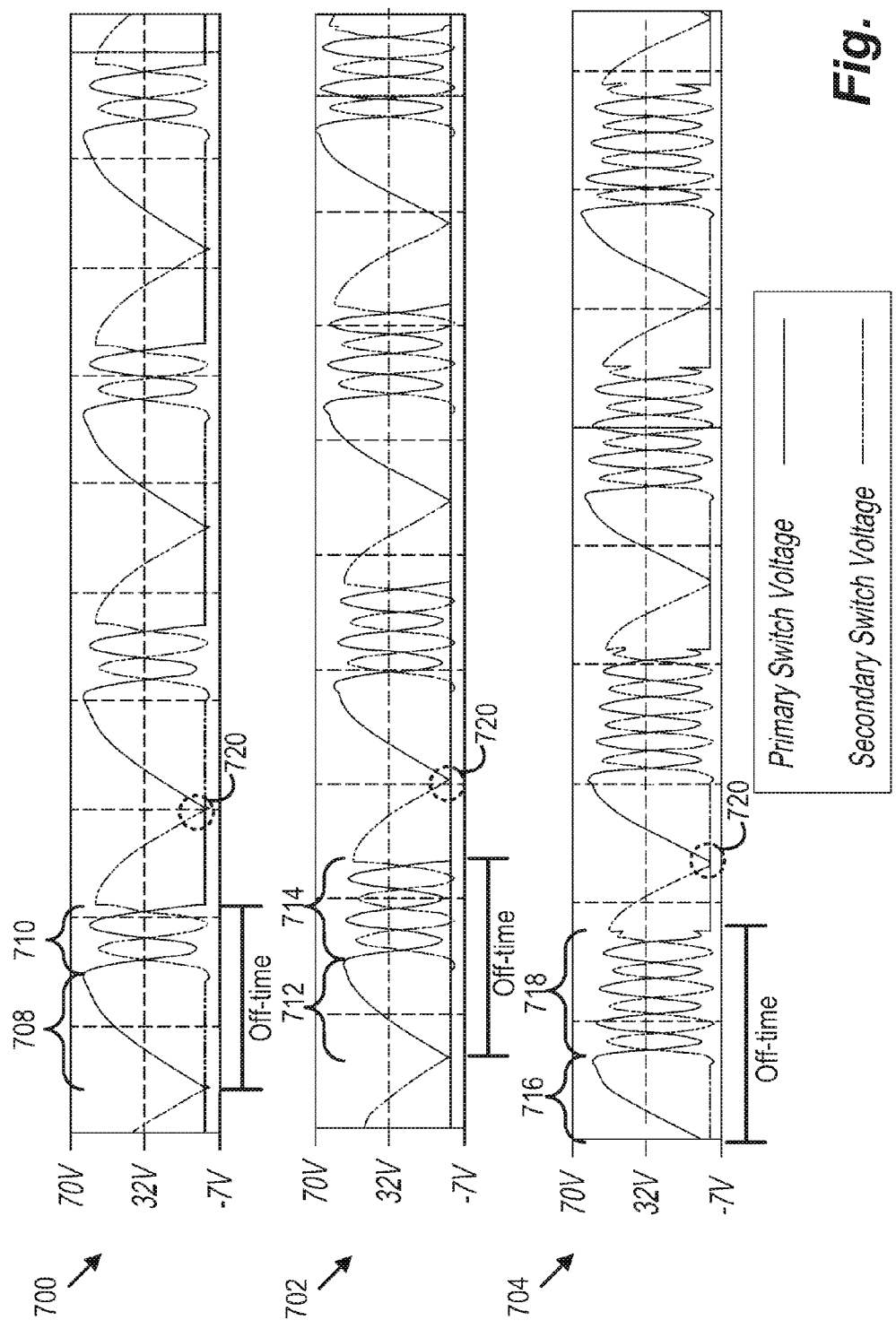
FIG. 7C is an exemplary graph of switch voltages during power transfer in a DC-DC power conversion circuit.

FIG. 7C is an exemplary graph of switch voltages during power transfer in the DC-DC power conversion circuit 100 in the quasi-resonant mode. Graph 700 corresponds to 83 W of power transfer from the primary side to the secondary side of the DC-DC power conversion circuit 100, graph 702 corresponds to 65 W of power transfer, and graph 304 corresponds to 59 W of power transfer, which all correspond to minimum power transfer values associated with the power transfer ranges determined at step S606 of the quasi-resonant power transfer process 600. For each amount of power transfer in the graphs 700, 702, and 704, the amount of on-time for each duty cycle of the primary switch 106 is constant, and the amount of off-time is modified to include one or more quasi-resonance periods based on the amount of power transfer.

The amount of off-time of the primary switch 106 can be increased or decreased inversely proportional to the amount of power transfer. For example, in the graph 700 that corresponds to 83 W of power transfer, the off-time of the primary switch 106 includes series resonance period 708 plus 1.5 quasi-resonance periods 710. In the graph 702 that corresponds to 65 W of power transfer, the off-time includes series resonance period 712 plus 2.5 quasi-resonance periods 714. In the graph 704 that corresponds to 59 W of power transfer, the off-time includes series resonance period 716 plus 3.5 quasi-resonance periods 718. Modifying the amount of off-time of the primary switch 106 in the quasi-resonant mode results in the ZVS of the secondary switch 108 as the primary switch 106 and the secondary switch 108 are turned on and off. For example, time 720 corresponds to a turn-off of the primary switch 106 and a turn-on of the secondary switch 108 that is functioning as the synchronous rectifier, which corresponds to a voltage across the secondary switch 108 that is approximately zero.

Figures 8, 9:
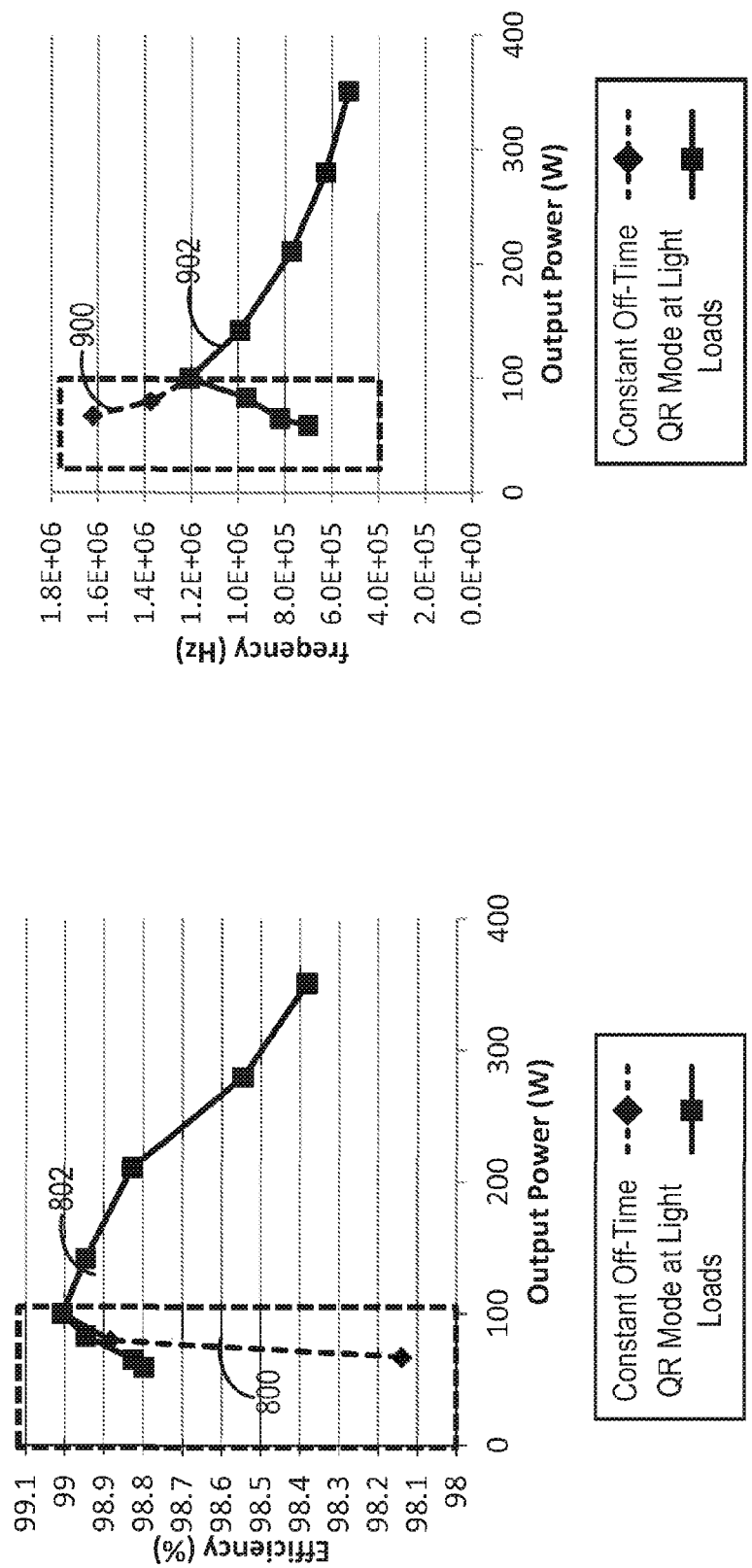
FIG. 8 is an exemplary graph of power transfer efficiency for a DC-DC power conversion circuit.
FIG. 9 is an exemplary graph of switching frequency for a DC-DC power conversion circuit.

FIG. 8 is an exemplary graph of power transfer efficiency for the DC-DC power conversion circuit 100. Curve 800 represents power transfer efficiency when the primary switch 106 is operated with a constant off-time for all amounts of power transfer. Curve 802 represents power transfer efficiency when the primary switch 106 is operated in a normal operation mode when the amount of power transfer is greater than or equal to the power threshold 202 of 100 W and in the quasi-resonant mode when the amount of power transfer is less than the power threshold 202. The curves 800 and 802 show that implementing the quasi-resonant mode when the amount of power transfer is less than the power threshold 202 results in increased power transfer efficiency at light loads.

FIG. 9 is an exemplary graph of switching frequency for the DC-DC power conversion circuit 100. Curve 900 represents the switching frequency when the primary switch 106 is operated with a constant off-time for all amounts of power transfer. Curve 902 represents the switching frequency when the primary switch 106 is operated in a normal operation mode when the amount of power transfer is greater than or equal to the power threshold 202 of 100 W and in the quasi-resonant mode when the amount of power transfer is less than the power threshold 202. The curve 900 shows that when the constant off-time is implemented at light loads less than 100 W, the switching frequency is higher than at higher loads. The curve 902 shows that the switching frequency of the primary switch 106 when the amount of power transfer is equal to the power threshold 202 of 100 W is greater than the switching frequency when the amount of power transfer is less than the power threshold 202. Therefore, implementing the quasi-resonant mode at light loads that are less than the power threshold 202 results in a reduced switching frequency, which reduces losses in the DC-DC power conversion circuit 100.

Figure 10B:
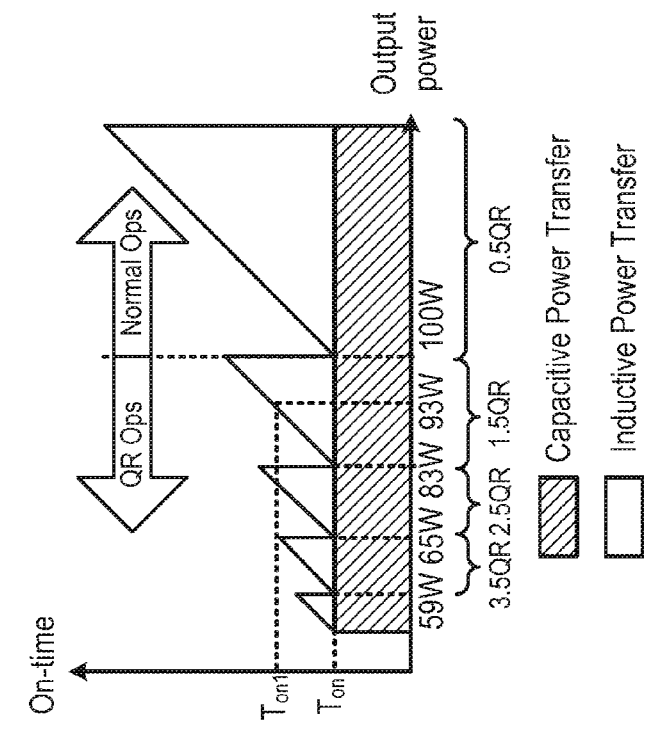
FIG. 10B is an exemplary graph of on-time versus output power for a DC-DC power conversion circuit.
Figure 10A:
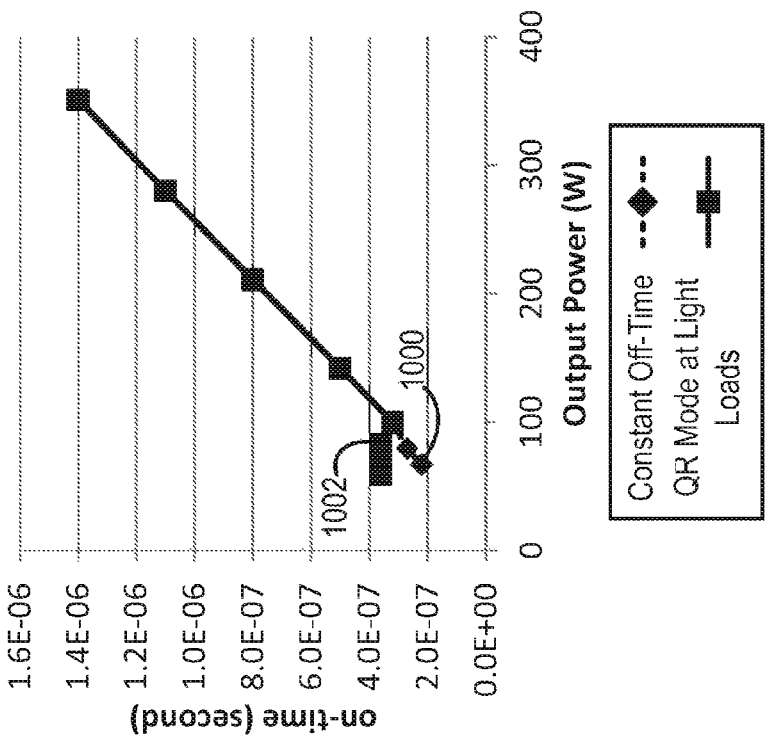
FIG. 10A is an exemplary graph of on-time versus output power for a DC-DC power conversion circuit.

FIG. 10A is an exemplary graph of on-time versus amount of power transfer for the DC-DC power conversion circuit 100. Curve 1000 represents the amount of power transfer versus on-time when the primary switch 106 is operated with a constant off-time for all amounts of power transfer. Curve 1002 represents the power transfer versus on-time when the primary switch 106 is operated in a normal operation mode when the amount of power transfer is greater than or equal to the power threshold 202 of 100 W and in the quasi-resonant mode when the amount of power transfer is less than the power threshold 202. The data points in the curve 1002 correspond to the minimum power transfer values of the power transfer ranges associated with the predetermined number of quasi-resonant periods incorporated into the off-time of the primary switch 106. For example, the on-time of the primary switch 106 can be increased in the quasi-resonant mode to transfer an amount of power between two of the minimum power transfer values. As can be seen from the curve 1002, the on-time of the primary switch 106 can be held constant at light loads less than 100 W in the quasi-resonant mode. In addition, as the amount of power transfer increases above 100 W, the normal operating mode is implemented, and the on-time of the primary switch 106 can be increased while the off-time is held constant.

FIG. 10B is an exemplary graph of on-time versus amount of power transfer for the DC-DC power conversion circuit 100. The graph shows the on-times of the primary switch 106 for the power transfer ranges associated with various numbers of quasi-resonance periods incorporated into the off-time of the primary switch 106. For example, the graph includes on-times for the normal operation mode where the off-time of the primary switch 106 is held constant to include $T_{CAP}$ plus 0.5 quasi-resonance periods. The graph also includes on-times for the quasi-resonant mode where the amount of power transfer is less than the power threshold 202. For example, in the quasi-resonant mode, the off-time of the primary switch 106 can include $T_{CAP}$ plus 1.5, 2.5, 3.5, or more quasi-resonance periods. For each of the power transfer ranges, the primary switch has a minimum on-time of $T_{ON}$ where the total amount of power transfer includes only capacitive power transfer. As the amount of power transfer increases within each of the power transfer ranges, the on-time of the primary switch 106 is increased so that the total amount of power transfer includes both inductive and capacitive power transfer. For example, when the total amount of power transfer is equal to 93 W, the on-time of the primary switch 106 is increased to $T_{ON1}$ so that the total amount of power transfer includes 83 W of capacitive power transfer and 10 W of inductive power transfer.

FIG. 11A is an exemplary graph of off-time versus amount of power transfer for the DC-DC power conversion circuit 100. Curve 1100 represents approximately constant off-time for all amounts of power transfer. Curve 1102 represents the off-time versus power transfer when the primary switch 106 is operated in a normal operation mode when the amount of power transfer is greater the power threshold 202 of 100 W and in the quasi-resonant operations when the amount of power transfer is less than the power threshold 202. The data points in region 1104 the curve 1102 correspond to the minimum power transfer values of the power transfer ranges associated with the predetermined number of quasi-resonant periods incorporated into the off-time of the primary switch 106. For example, the region 1104 of the curve 1102 shows that in the quasi-resonant mode, the off-time of the primary switch 106 may be longest at the lowest amounts of power transfer, and the off-time decreases as the amount of power transfer increases. For amounts of power transfer greater than or equal to the power threshold 202 of 100 W, the DC-DC power conversion circuit 100 is operated in the normal operating mode, and the off-time of the primary switch 106 is constant.

FIG. 11B is an exemplary graph of off-time versus amount of power transfer for the DC-DC power conversion circuit 100. The graph shows the off-times of the primary switch 106 for the power transfer ranges associated with various numbers of quasi-resonance periods incorporated into the off-time of the primary switch 106. The vertical axis of the graph includes off-times for the primary switch 106 that include 0.5, 1.5, 2.5, and 3.5 quasi-resonance periods as described previously by equation (2). For example, when the amount of power transfer is greater than equal to 100 W, the off-time of the primary switch 106 is equal to $T_{cap}+0.5\times2\pi\sqrt{LC}$. From 83 W to less than 100 W including 93 W, the off-time is equal to $T_{cap}+1.5\times2\pi\sqrt{LC}$. From 65 W to less than 83 W, the off-time is equal to $T_{cap}+2.5\times2\pi\sqrt{LC}$. From 59 W to less than 65 W, the off-time is equal to $T_{cap}+3.5\times2\pi\sqrt{LC}$. Within each of the power transfer ranges associated with a number of quasi-resonance periods, the off-time of the primary switch 106 can remain constant.

Aspects of the present disclosure are directed to improving efficiency of DC-DC power conversion circuits by implementing a quasi-resonant mode at light loads. The control circuitry can operate the DC-DC power conversion circuit 100 in a normal operation mode at amount of power transfer that are greater than or equal to a power threshold, which corresponds to a lowest amount of power transfer that includes both inductive and capacitive power transfer. At amounts of power transfer that are less than the power threshold, the DC-DC power conversion circuit 100 is operated in the quasi-resonant mode where the off-time of the primary switch 106 can be modified to increase the amount of power transfer. Operating in the quasi-resonant mode at light loads provides for soft-switching of the both the primary switch 106 and the secondary switch 108, which reduces switching losses and improves efficiency.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 12:
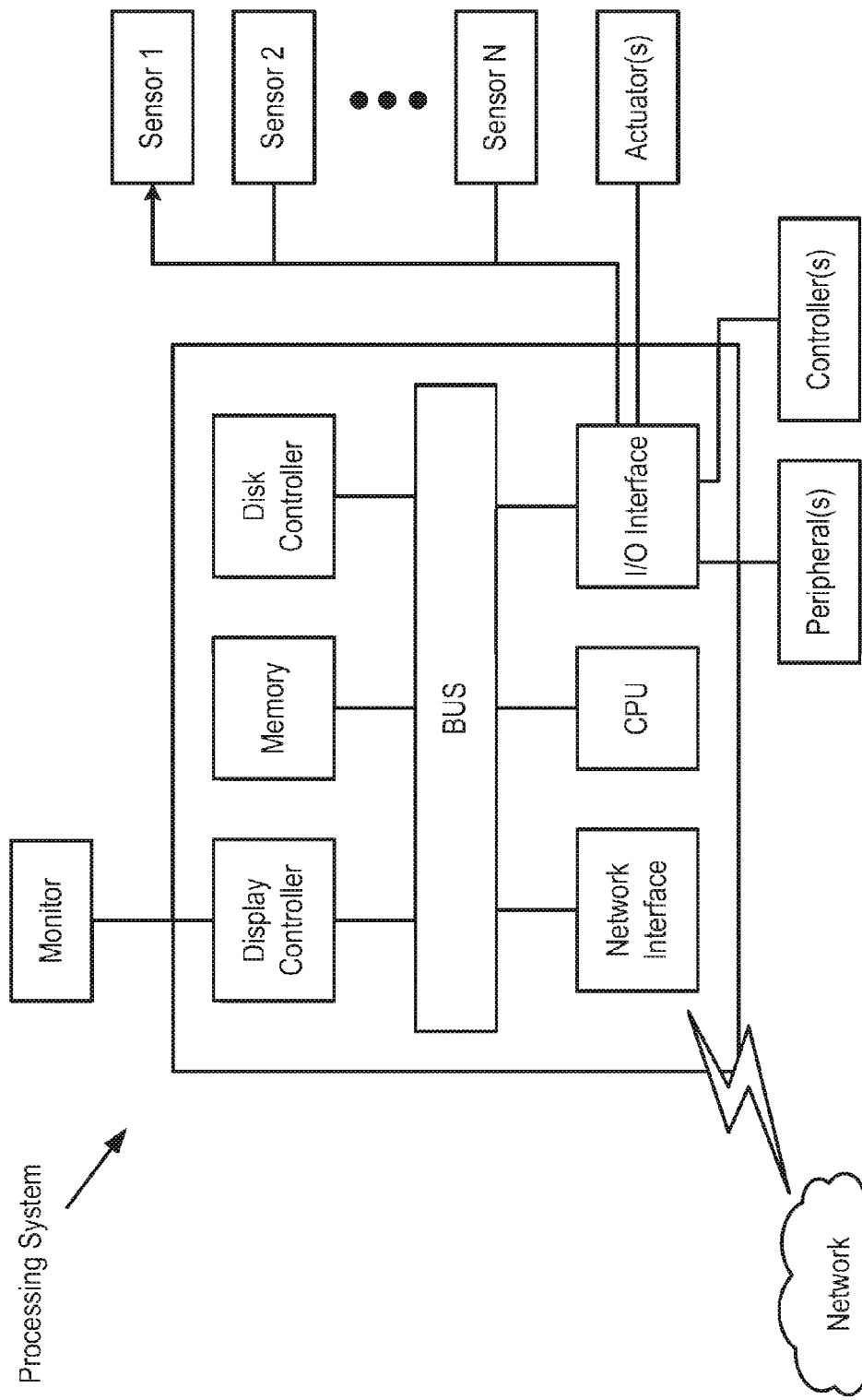
FIG. 12 schematically illustrates a processing system, such as a controller and/or a computer system.

FIG. 12 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the DC-DC power conversion circuit 100 or distributed power system. For example, the user can use the controller to set up default periods and duty cycles for the primary switch 106 and the secondary switch 108 of the DC-DC power conversion circuit 100. The I/O interface can also provide an interface for outputting control signals to one or more actuators to control various actuated components, including gate driver circuits and other circuitry in the DC-DC power conversion circuit 100. In some implementations, the actuators send control signals to control the duty cycle or switching frequency of the primary switch 106 and secondary switch 108, operating frequency, and direction of power transfer of the DC-DC power conversion circuit 100.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
DC-DC power conversion circuitry including a first switch and a second switch on either side of a transformer, the transformer being connected to the first and second switches such that currents and voltages in both windings of the transformer are in phase; and control circuitry configured to
control an amount of power transfer from a primary side to a secondary side of the DC-DC power conversion circuitry based on an amount of on-time or off-time of the first switch,
determine a power threshold corresponding to a lowest amount of power transfer that results in soft switching of the second switch with a constant off-time of the first switch,
operate the DC-DC power conversion circuitry in a quasi-resonant mode when the amount of power transfer from the primary side to the secondary side of the DC-DC power conversion circuitry is less than the power threshold, and
determine one or more minimum power transfer values associated with one or more quasi-resonant power transfer ranges in the quasi-resonant mode.

2. The system of claim 1, wherein the DC-DC power conversion circuitry includes a first capacitor and a second capacitor cross-connected across the transformer.

3. The system of claim 1, wherein the primary side and the secondary side of the DC-DC power conversion circuitry are symmetric across the transformer.

4. The system of claim 1, wherein the DC-DC power conversion circuitry is configured to perform bi-directional power transfer.

5. The system of claim 1, wherein the power threshold corresponds to a highest amount of power transfer from the primary side to the secondary side of the DC-DC power conversion circuitry that includes only capacitive power transfer when the first switch is operated with the constant off-time.

6. The system of claim 1, wherein the control circuitry is further configured to operate the DC-DC power conversion circuitry in a normal operation mode when the amount of power transfer from the primary side to the secondary side of the DC-DC power conversion circuitry is greater than or equal to the power threshold.

7. The system of claim 6, wherein the off-time of the first switch in the normal operation mode corresponds to a series resonance period plus half of a quasi-resonance period.

8. The system of claim 6, wherein operating the DC-DC power conversion circuitry in the normal operation mode includes modifying the amount of power transfer by increasing or decreasing the on-time of the first switch.

9. The system of claim 6, wherein the off-time of the first switch in the normal operation mode is constant.

10. The system of claim 6, wherein the amount of power transfer in the normal operation mode includes an amount of capacitive power transfer corresponding to the power threshold plus an amount of inductive power transfer based on the on-time of the first switch.

11. The system of claim 1, wherein each of the one or more quasi-resonant power transfer ranges correspond to the off-time of the first switch that includes a series resonance period plus a predetermined number of quasi-resonance periods.

12. The system of claim 11, wherein the control circuitry is further configured to increase the predetermined number of quasi-resonant periods included in the off-time of the first switch as the amount of power transfer from the primary side to the secondary side of the DC-DC power conversion circuitry decreases.

13. The system of claim 11, wherein the predetermined number of quasi-resonant periods corresponds to an integer plus half of a quasi-resonance period.

14. The system of claim 1, wherein the amount of power transfer at the one or more minimum power transfer values is associated with a first amount of on-time of the first switch and includes only capacitive power transfer.

15. The system of claim 14, wherein the control circuitry is further configured to increase the amount of power transfer within one of the one or more power transfer ranges to a value greater than one of the one or more minimum power threshold values by increasing the on-time of the first switch to a second amount of on-time that is greater than the first amount of on-time.

16. The system of claim 15, wherein the amount of power transfer associated with the second amount of on-time includes the capacitive power transfer and inductive power transfer.

17. A method comprising:
controlling an amount of power transfer from a primary side to a secondary side of DC-DC power conversion circuitry including a first switch and a second switch on either side of a transformer based on an amount of on-time or off-time of the first switch, the transformer being connected to the first and second switches such that currents and voltages in both windings of the transformer are in phase;
determining a power threshold corresponding to a lowest amount of power transfer that results in soft switching of the second switch with a constant off-time of the first switch;
operating the DC-DC power conversion circuitry in a quasi-resonant mode when the amount of power transfer from the primary side to the secondary side of the DC-DC power conversion circuitry is less than the power threshold; and
determining one or more minimum power transfer values associated with one or more quasi-resonant power transfer ranges in the quasi-resonant mode.

18. A non-transitory computer-readable storage medium including executable instructions, which when executed by circuitry, causes the circuitry to perform the method according to claim 17.

19. A system controller comprising:
control circuitry configured to
control an amount of power transfer from a primary side to a secondary side of DC-DC power conversion circuitry including a first switch and a second switch on either side of a transformer based on an amount of on-time or off-time of the first switch, the transformer being connected to the first and second switches such that currents and voltages in both windings of the transformer are in phase,
determine a power threshold corresponding to a lowest amount of power transfer that results in soft switching of the second switch with a constant off-time of the first switch,
operate the DC-DC power conversion circuitry in a quasi-resonant mode when the amount of power transfer from the primary side to the secondary side of the DC-DC power conversion circuitry is less than the power threshold, and
determine one or more minimum power transfer values associated with one or more quasi-resonant power transfer ranges in the quasi-resonant mode.

* * * * *